June 11, 1929.  H. AUSTIN  1,716,411
STEERING GEAR CHECK
Filed Nov. 5, 1925   2 Sheets-Sheet 1
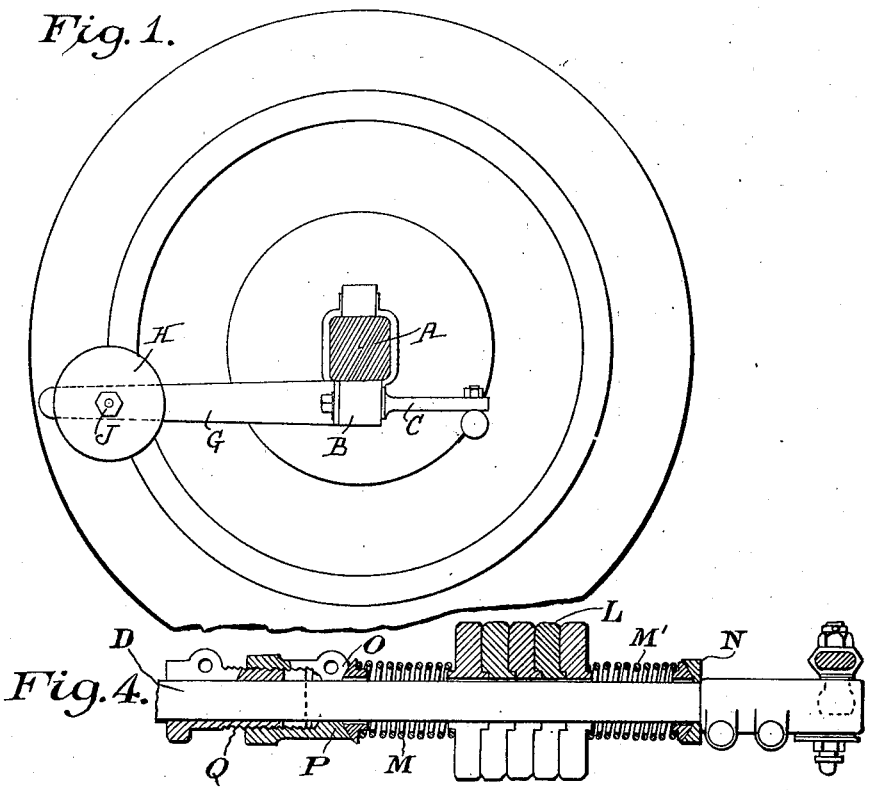
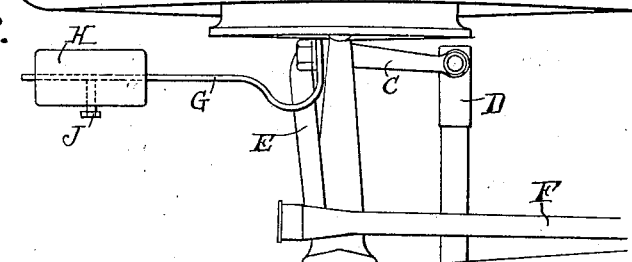

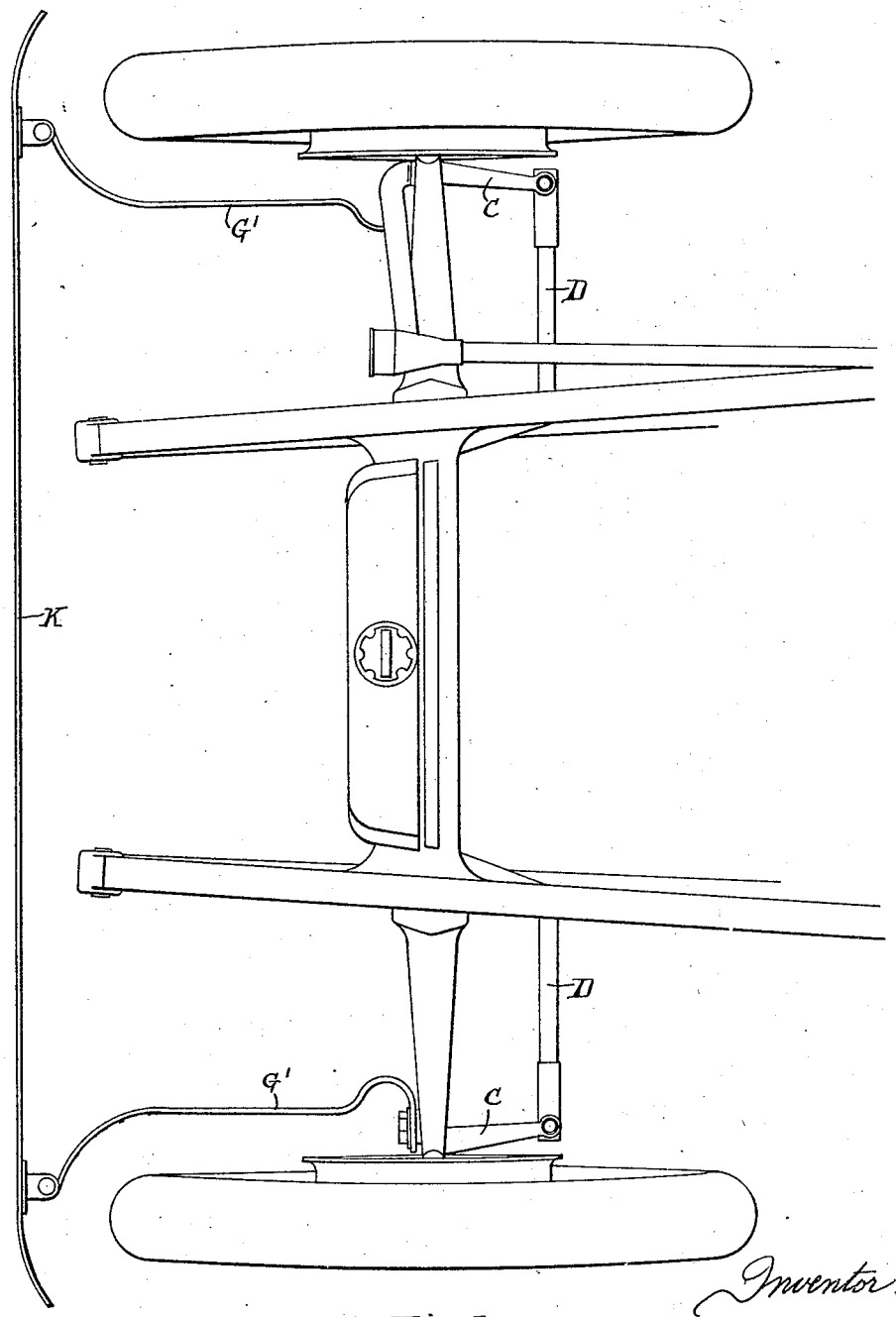

Patented June 11, 1929.

1,716,411

UNITED STATES PATENT OFFICE.

HERBERT AUSTIN, OF BROMSGROVE, ENGLAND.

STEERING-GEAR CHECK.

Application filed November 5, 1925, Serial No. 67,024, and in Great Britain September 11, 1925.

As is well known, it happens, in the case of some motor vehicles, that the steering wheels have a tendency to oscillate laterally under certain conditions, which interferes with the smooth running of the vehicle and with the comfort of steering; and may even be a source of danger.

The object of the present invention is to provide means for ensuring that such oscillation will not take place.

The invention comprises means by which the natural periodicity of a steering wheel is counteracted by another vibrator having a different periodicity, the separate vibrator being coupled to the respective wheel by elastic means possessing adequate elasticity to allow of the different periodicity.

A convenient embodiment of the invention is described by reference to the drawings herewith, of which:—

Figure 1 (Sheet 1) shows in side elevation means for preventing oscillation of a steering wheel and comprising a weighted spring arm connected to the stub axle of the wheel.

Figure 2 is a plan view of the device shown in Figure 1.

Figure 3 (Sheet 2) is a plan view of a modification in which the bumper bar is utilized as the anti-vibration weight.

Figure 4 (Sheet 3) is a sectional view to illustrate a modification in which a spring controlled weight is mounted upon a steering knuckle coupling rod; and, Figure 5 is a sectional view to illustrate a modification in which the coupling rod itself is divided by a spring connection.

Referring first to Figures 1 and 2, A represents the fixed front axle or beam (shown in section) and B the inner end of the corresponding stub axle, the latter carrying the usual lever C connecting with the coupling bar D and the lever E connecting with the steering rod F. G is a spring arm bolted to the lower end of the stub axle B and carrying an adjustable weight H clamped thereon by a set screw J.

Assuming that the wheel should for any reason commence to oscillate, which it is in some cases liable to do at its own natural periodicity, it will communicate vibration to the spring bar G, through the medium of the stub axle, and tend to cause the bar G with its weight H, acting as a vibrator, to vibrate at its own natural periodicity which is arranged to be different from that of the wheel, so that it has the effect of damping out the oscillations of the wheel as soon as there is any tendency for them to be set up In the above case each steering wheel may be provided with a spring arm and weight, but not necessarily so because the two wheels, being coupled by the bar D, tend to oscillate as a single unit.

In Figure 3 the springs G' are very similar to that shown in Figures 1 and 2, but a bumper bar K is made to take the place of the weight H, the bar connecting to the spring arm G of each steering wheel. All that is necessary is to arrange that the natural periodicity of the bar K, with its two spring arms G', is different from the natural periodicity of the two wheels coupled together by the bar D.

Referring to Figure 4, the weight L is arranged to slide upon the coupling bar D, and is controlled in its position thereon by means of two coil springs M M' of which the spring M' bears inwards against the weight L, and outwards against a fixed thrust washer N. The coil spring M bears outwards against a thrust washer O which is adjustable along the bear D by the nut P, which screws upon a screwed sleeve Q which may be clamped to the coupling bar D in any desired position. It will be seen that the weight L acting in conjunction with the springs M M', has a natural periodicity of oscillation of its own in relation to the bar D. If, therefore, the two steering wheels which are coupled together by the bar D, tend to oscillate, they must also produce endwise oscillation of the bar D, and this will be damped out by the different periodicity of the weight and spring system.

As there is substantially no probability of the periodicity of oscillation of the two steering wheels of the vehicle being identical, the tendency to oscillate on the part of the one wheel may act as the damping means to the oscillation of the other, provided that the two wheels are resiliently connected together. This may be effected by dividing the coupling means between the two wheels by a spring connection, and such an arrangement is illustrated in Figure 5. In this case the coupling bar D is of telescopic form, comprising a hollow sleeve S with a bar R sliding within it. Rigid with the bar R is a sleeve T, having integrally formed upon its outer end a thrust collar U. The sleeve S has screwed upon it a sleeve W, secured by a lock nut X, and upon the sleeve W is screwed a sleeve Y provided with an inwardly extending thrust collar Z.

On the two sides of the thrust collar U, are placed coil springs *a* and *b*. The tension of the springs *a* and *b* can be varied as desired by screwing the sleeve Y upon the sleeve W and the latter upon the sleeve S. Any tendency of the one wheel to oscillate will cause such oscillations to be communicated to the corresponding part of the coupling bar, say the sleeve S, and this will cause vibration of the bar R and hence of the other wheel; and, this latter being of a different periodicity from that of the first mentioned wheel, will tend to damp out the oscillation.

Having fully described my invention, what I claim and desire to secure by Letters Patent is:—

1. In a device of the kind described, a front axle, a steering knuckle mounted to swing on a vertical axis on said axle, a spring arm fixed to the steering knuckle and projecting in a longitudinal direction of the vehicle, the end of said arm being vibratable independently of the movement of the steering knuckle, and a weight carried at the end of said arm.

2. In a device of the kind described, a front axle, a steering knuckle mounted to swing on a vertical axis on said axle, a spring arm fixed to the steering knuckle and projecting in a longitudinal direction of the vehicle, the end of said arm being vibratable independently of the movement of the steering knuckle, a weight slidably mounted on the end of said arm to move toward and from the steering knuckle, and means to secure the weight in adjusted position on said arm.

In witness whereof I have hereunto signed my name this 7th day of October, 1925.

HERBERT AUSTIN.